US006437064B1

(12) United States Patent
Eckstein et al.

(10) Patent No.: US 6,437,064 B1
(45) Date of Patent: *Aug. 20, 2002

(54) STRUCTURES OF POLYMERS MADE FROM SINGLE SITE CATALYSTS

(75) Inventors: John P. Eckstein, Neenah; Johnny Q. Zheng, Appleton; Mark E. Nordness, Neenah; Keith D. Lind, Appleton; George H. Walburn, Menasha; Mary E. Shepard, Oshkosh; Gregory K. Jones, Appleton; Gregory J. Seeke, Oshkosh, all of WI (US)

(73) Assignee: Pechiney Emballage Flexible Europe (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/006,700

(22) Filed: Jan. 14, 1998

Related U.S. Application Data

(63) Continuation of application No. 08/481,617, filed on Jun. 7, 1995, now abandoned, which is a continuation of application No. 08/082,226, filed on Jun. 24, 1993, now abandoned.

(51) Int. Cl.[7] .......................... C08F 110/02; B32B 27/08
(52) U.S. Cl. ................ 526/160; 526/329.4; 526/329.6; 526/330; 526/326; 526/343; 526/351; 526/352; 526/348.5; 428/516
(58) Field of Search ............................. 526/329.4, 343, 526/160, 352, 351, 348.5, 326, 329.6, 330, 344.1; 428/516

(56) References Cited

U.S. PATENT DOCUMENTS

| | | | |
|---|---|---|---|
| 3,579,491 A | * 5/1971 | Carrega et al. | 526/344.1 |
| 4,457,960 A | 7/1984 | Newsome | 428/35 |
| 4,647,483 A | 3/1987 | Tse et al. | |
| 4,680,353 A | * 7/1987 | Ishihara et al. | 526/160 |
| 4,695,491 A | 9/1987 | Kondo et al. | 428/35 |
| 4,788,105 A | 11/1988 | Mueller et al. | 428/412 |
| 4,801,652 A | * 1/1989 | Mizutani et al. | 525/240 |
| 4,803,122 A | 2/1989 | Schirmer | 428/349 |
| 4,863,769 A | 9/1989 | Lustig et al. | |
| 4,871,705 A | 10/1989 | Hoel | 502/117 |
| 4,891,253 A | 1/1990 | Mueller | 428/35.2 |
| 4,952,451 A | * 8/1990 | Mueller | 426/516 |
| 4,957,946 A | 9/1990 | Meier et al. | |
| 5,064,797 A | 11/1991 | Stricklen | 502/111 |
| 5,089,521 A | 2/1992 | Wing et al. | |
| 5,089,536 A | 2/1992 | Palazotto | 522/16 |
| 5,204,402 A | 4/1993 | Funaki et al. | 526/336 |
| 5,206,075 A | 4/1993 | Hodson, Jr. | |
| 5,262,228 A | 11/1993 | Kohyama et al. | |
| 5,272,236 A | 12/1993 | Lai et al. | 526/348.5 |
| 5,283,128 A | 2/1994 | Wilhoit | 428/516 |
| 5,336,746 A | 8/1994 | Tsutsui et al. | 526/348.6 |
| 5,358,792 A | 10/1994 | Mehta et al. | |
| 5,376,439 A | 12/1994 | Hodson et al. | 428/220 |
| 5,397,613 A | 3/1995 | Georgelos | 428/36.7 |
| 5,397,640 A | 3/1995 | Georgelos et al. | 428/349 |
| 5,539,066 A | 7/1996 | Winter et al. | |
| 5,562,958 A | 10/1996 | Walton et al. | 428/34.9 |
| 5,698,279 A | * 12/1997 | Vicik | 428/34.8 |
| 5,707,751 A | * 1/1998 | Garza et al. | 525/240 |
| 5,852,152 A | * 12/1998 | Walton et al. | 526/348.1 |

FOREIGN PATENT DOCUMENTS

| | | |
|---|---|---|
| EP | A 0 451 997 | 10/1991 |
| EP | A 0516019 | 12/1992 |
| EP | A 0552911 | 7/1993 |
| EP | 0 120 503 | 3/1994 |
| EP | 0 597 502 | 5/1994 |
| JP | A 03 026541 | 2/1992 |
| WO | 95/04761 | 2/1992 |
| WO | A 9214784 | 3/1992 |
| WO | A 9406857 | 3/1994 |
| WO | A 9407954 | 4/1994 |
| WO | 94/09060 | 4/1994 |
| WO | A 9418263 | 8/1994 |

OTHER PUBLICATIONS

Peterson, *Metallo–Organic Chemistry*, Wiley and Sons, pp. 310–313, 1985.

Encyclopedia of Polymer Science and Engineering, *Films, Manufacture*, vol. 7, pp. 88–89, 1987.

Schut, Enter a New Generation of Polyolefins, Plastics Technology, pp. 15–17, Nov., 1991.

Childress, B.C., *Properties of Homogeneous and Heterogeneous Polyolefins:* . . . (May, 1994).

Lai, S. et al., Dow Rheology Index (DRI) for Insite Technology Polyolefins (ITP): . . . ANTEC '94, pp. 1814–1815 (1994).

Chowdbury, Jayadev et al., Polymers by Blueprint, Chemical Engineering, vol. 100/No. 4, p. 34 (Apr. 1993).

Sinclair, K.B., New Polyolefins From Emerging Catalyst Technologies, Society of Plastics Engineers Polyolefins VIII Int'l. Conf. (Feb. 21–24, 1993).

(List continued on next page.)

*Primary Examiner*—James J. Seidleck
*Assistant Examiner*—Olga Asinovsky
(74) *Attorney, Agent, or Firm*—McDermott, Will & Emery

(57) ABSTRACT

Copolymers of ethylene and alpha olefins that have been formed by a polymerization reaction in the presence of a single site catalyst, such as a metallocene, are used as a film or as a layer in multiple layer films, including molecularly oriented and irradiated heat shrinkable films. Novel blends of the copolymers with other polymeric materials are disclosed and used as a film or a layer in a film particularly in molecularly oriented and heat shrinkable films. Bags made from the multiple layer films are especially useful for shrink packaging primal cuts of meat. Processes for the formation of flexible films and packages made therefrom are also disclosed.

39 Claims, 1 Drawing Sheet

OTHER PUBLICATIONS

Ulbricht, et al., Abstr. of Plaste Kaut. 18(4), CAPLUS 1971:421192, pp. 250–254, 1971.

Sihn, H.J. et al., Adv. Organomet. Chem. 18, 99, pp. 123–130, 1980.

Godian et al., Principles of Polymerization, 2d Ed., Wiley, New York, pp. 99–102 & 616, 1981.

Ahadian et al., Abstr. of Proc. IUPAC Macromed Symp., 28th CAPLUS 1983:522989, p. 256 (1982).

Moore, Stephen, Crystalline PS is Claimed to Yield Engineering–Resin Performance, Modern Plastics, vol. 69/No. 11, p. 30 (Nov. 1992).

Lai, S. et al., CGCT: New Rules for Ethylene α–Olefin Interpolymers—Controlled Melt Rheology Polyolefins, ANTEC '93, pp. 1188–1192 (1993).

Van der Sanden, D., A New Family of Linear Ethylene Polymers with Enhanced Sealing Performance Designed for Multilayer Barrier Food Packaging Films, ANTEC '93, pp. 46–50 (1993).

Patel, R.M. et al., Investigation of Processing—Structure—Properties Relationships in Polyethylene Blown Films, ANTEC '93, pp. 465–467 (1993).

Butler, T.I. et al., Blown Film Bubble Forming and Quenching Effects on Film Properties, ANTEC '93, pp. 51–57 (1993).

Woo, L. et al., Thermoplastic Elastomer Behavior of Ultra–Low Density Polyethylene and a Comparison with Flexible PVC, ANTEC '93, pp. 358–363 (1993).

Story, B.A. et al., The New Family of Polyolefins from Insite* Technology, METCON '93 (1993).

Leaversuch, Robert D., New Process Technologies May Expand Properties, Markets, Modern Plastics, vol. 70/No. 1, p. 58 (Jan. 1993).

Leaversuch, Robert D., Reforumlations, Redesigns Upgrade Blood Devices, Modern Plastics, vol. 70/No. 2, p. 44 (Feb. 1993).

Edmondson, M.S. et al., CGCT: New Rules for Ethylene Alpha–Olefin Interpolymers—Processing—Structure—Property Relationships in Blown Films, ANTEC '93, pp. 63–65 (Feb. 1993).

Kiesche, Elizabeth S., Catalysts, Additives, Environment Head Up CMRA Meeting Agenda, Chemical Week, p. 10, (Feb. 3, 1993).

Union–Carbide Unveils Unipol II, Press Association Newfile, (Mar. 1, 1993).

Union Carbide Unveils Unipol II Process . . . , Plastics Focus, vol. 25, No. 5 (Mar. 8, 1993).

Rotman, David, Carbide to Debut Unipol II Technology at New Plant, Chemical Week, p. 6 (Mar. 10, 1993).

Swogger, Kurt W. et al., Process Technology for Unique Polymer Design Using DOW Constrained Geometry Catalyst, SPE VII International Polyolefins RETEC Conference Proceddings, pp. 13–20 (1993).

Miller, Bernie, New Film Resins Push Performance, Plastics World, vol. 50/No. 6, p. 46 (May, 1992).

Leaversuch, Robert, Polyolefins Gain Higher Performance from New Catalyst Technologies, Modern Plastics, pp. 46–49 (Oct. 1991).

Nifant'ev, I.E. et al., ansa–Metallocene Derivatives of $Ti^{IV}$ and $Zr^{IV}$ With the Shortest—$C(CH_3)_2$–Bridge, Journal of Organometallic Chemistry, vol. 435, pp. 37–42 (1992).

Van der Sanden, D., A New Family of Linear Ethylene Polymers, TAPPI Proceedings, pp. 289–296 (1991).

Exxon Cites 'Breakthrough' in Olefins Polymerization, Modern Plastics, vol. 68/No. 7, p. 61 (Jul. 1991).

McKeever, Dennis, Dow Plastics Editor Briefing (Dec. 17, 1991).

Sishta, Chand et al., Group 4 Metallocene—Allumoxane Olefin Polymerization Catalysts, J. Am. Chem. Soc., vol. 114, pp. 1112–1114 (1992).

Swogger, Kurt W., The Material Properties of Polymers Made from Constrained Geometry Catalysts, SPO '92, pp 155–165 (1992).

Collins, Scott et al., Polymerization of Propylene Using Supported, Chiral, ansa–Metallocene Catalysts: Production of Polypropylene with Narrow Molecular Weight Distributions, Macromolecules, vol. 25, pp. 1780–1785 (1992).

Llinas, Geraldo Hidalgo et al., Crystalline–Amorphous Block Polypropylene and Nonsymmetric ansa–Metallocene Catalyzed Polymerization, Macromolecules, vol. 25, pp. 1242–1253 (1992).

Trudell, B.C. et al., Single Site Catalyzed Ethylene Copolymers: Structure/Property Relationships, ANTEC '92, pp. 613–617 (1992).

Chien, James C.W. et al., Metallocene Catalysts for Olefin Polymerizations, Journal of Polymer Science, vol. 30, pp. 2601–2617 (1992).

Wood, Andrew et al., The Polyolefin Revolution, Chemical Week, p. 52 (May 13, 1992).

Leaversuch, R., Battle for Octene–Equivalency in LLDPE Film Heats Up, Modern Plastics, pp. 24–26 (Jun. 1992).

Wood, Andrew, Metallocenes—The Race to Breen a New Generation of Catalysts, Chemical Week, p. 42, (Jul. 1–8, 1992).

Schwank, G. Don, Constrained Geometry Catalyst Technology (CGCT) Polymers, SPO '92 (Sep. 23, 1992).

Martino, R., New Polyolefin Resins Emerge: 'Branched Linear' Copolymers, Modern Plastics, pp. 20–25 (Nov. 1992).

Dow's 1992 Ended with a Welcome Surprise Thanks to the U.S. Patent Office, p. 2.

Stevens, James C., Insite™ Catalyst Structure/Activity Relationships for Olefin Polymerization, METCON '93 (1993).

Knight, G.W. et al., Constrained Geometry Catalyst Technology: New Rules for Ethylene α–Olefin Interpolymers—Unique Structure and Property Relationships, Dow Plastics, Freeport, TX, pp. 226–241 (1993).

Sehanobish, K. et al., *Effect of Chain Microstructure on Modulus of Ethylene–α–Olefin Copolymers*, J. Appl. Pol. S., pp. 887–894 (1994).

Godwin, G., Ltd. in Assoc. w/The Plastics and Rubber Institute, Flow Properties of Polymer Melts, p. 71 (1981).

Dealy, John M. et al., Melt Rheology and it's Role in Plastics Processing, pp. 374–376 (1990).

Schwank, G. Don, Single–Site Metallocene Catalysts Yield Tailor–Made Polyolefin Resins, Modern Plastics, pp. 49–50 (Aug. 1993).

Schwank, G. Don, A New Family of Resins, Converting Magazine, pp. 78–80 (Sep. 1993).

Schwank, G. Don, A New Family of Resins—Part II, Converting Magazine, (Oct. 1993).

Barry, R.P. et al., Designed Polymers with INSITE Technology, Polyethylene '93, (Oct. 4, 1993).

Plumley, T.A. et al., Rheological Molding of INSITE Technology Polymers, ANTEC '94, pp. 1221–1225 (1994).

Polymers are Commercial, Food Engineering, p. 72 (Feb. 1993).

Lancaster, Gerald et al., Global Product and Application Development Utilizing INSITE Technology, METCON'94 (May 1994).

Stevens, J., INSITE Catalyst Str./Activity Relationship for Olefin Polymerization, METCON (May 1993).

Van der Sanden, D. et al., A New Family of Linear Ethylene Polymers with Enhanced Sealing Performance, TAPPI Proceedings, 1991 Polymers, Laminations & Coatings Conference, pp. 289–296.

Swogger, K.W. et al., Novel Molecular Structure Opens Up New Applications for Insite Based Polymers, SPO '93.

Mergenhagen, L., Polyolefin Plastomers as Sealants in Packaging Applications, TAPPI (Sep. 1993).

Pappas, Chris et al., Affinity Polyolefin Plastomers and ENGAGE Polyolefin Elastomers: . . . , CMSR (May 1994).

Swogger, K.W. et al., Improving Polymer Processability Utilizing CGSS Catalyst Technology, NPEC (Jun. 1994).

* cited by examiner

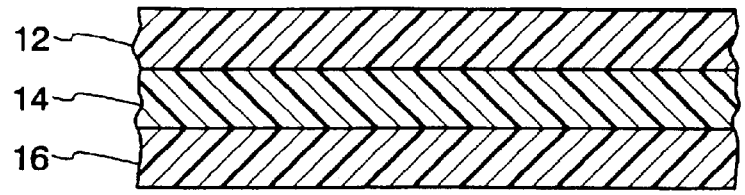
*Fig. 1*
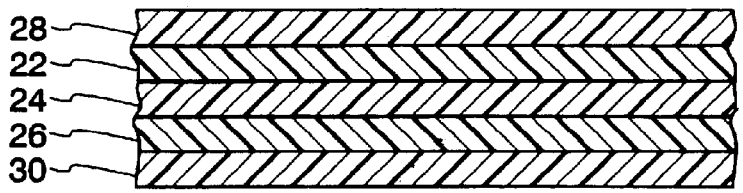
*Fig. 2*
Primary Metallocene Catalysts
*Fig. 3*
NON-STEREOSELECTIVE
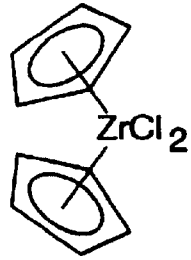
*Fig. 4*
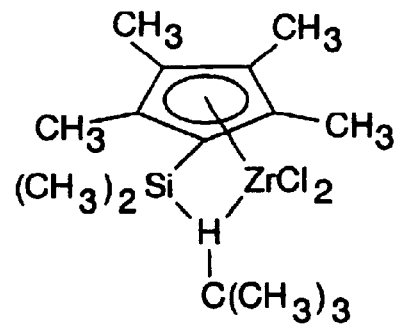
*Fig. 5*
STEREOSELECTIVE
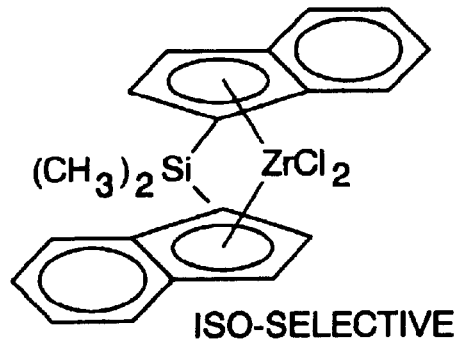
ISO-SELECTIVE
*Fig. 6*
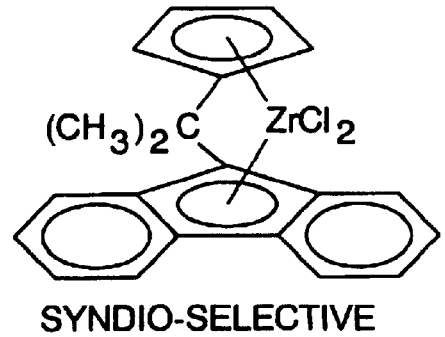
SYNDIO-SELECTIVE

STRUCTURES OF POLYMERS MADE FROM SINGLE SITE CATALYSTS

This application is a continuation of U.S. patent application Ser. No. 08/481,617, filed Jun. 7, 1995, now abandoned, which is a continuation of U.S. patent application Ser. No. 08/082,226, filed Jun. 24, 1993, now abandoned.

BACKGROUND OF THE INVENTION

Polymeric materials have many applications in packaging structures. They are used as films, sheets, lidstock, pouches, tubes and bags. These polymeric materials may be employed as a single layer or one or more layers in a structure. Unfortunately, there are countless polymeric materials available. Furthermore, resin suppliers frequently have a tendency to claim many more applications for a product than the product is actually suitable for. In addition, in view of the specialized applications and processing problems that are encountered despite the suppliers claims, one skilled in the art can not tell whether a particular resin will be suitable for an application unless tested. However, for various reasons there are frequently drawbacks to the use of many of these polymeric Materials. For example, ethylene vinyl alcohol is an excellent oxygen barrier material for use in packaging food products. However, this polymeric material can be affected by moisture that is present in the atmosphere or the packaged product. As a result, it is frequently found that some polymeric materials are better for certain applications than others.

One area where there is a need for suitable resins in film applications is in the area of heat shrinkable films. Heat shrinkable polymeric films are commonly used in packaging meats, particularly primal meat cuts and other large pieces of meat. While this description will detail the usage of films for packaging meat and meat by-products, it will be understood that these films are also suitable for packaging a myriad of other products, both including food products and non-food products.

Some of the films embodying the present invention are intended to be used by meat packers in the form of heat shrinkable bags with one opened end, which bags are closed and sealed after insertion of the meat. After the product is inserted, air is usually evacuated from the package and the open end of the bag is closed. Suitable methods of closing the bag include heat sealing, metal clips, adhesives etc. Heat is applied to the bag once sealing is completed to initiate shrinkage of the bag about the meat.

In subsequent processing of the meat, the bag may be opened and the meat removed for further cutting of the meat into user cuts, for example, for retail cuts or for institutional use.

Suitable shrink bags must satisfy a number of criteria. Many bag users seek a bag that is capable of surviving the physical process of filling, evacuating, sealing and heat shrinking. For example, during the shrinking process great stress can be placed on the film by the sharp edges of bone in the meat. The bag must also have sufficient strength to survive the material handling involved in moving the large cuts of meat, which may weigh a hundred pounds or more, along the distribution system.

Because many food products including meat deteriorate in the presence of oxygen and/or water, it is desirable that the bags have a barrier to prevent the infusion of deleterious gases and/or the loss or addition of moisture.

Conventional packaging for many products has frequently been made of multiple layer films having at least three layers. These multiple layer films are usually provided with at least one core layer of either an oxygen barrier material such as a vinylidene chloride copolymer, ethylene vinyl alcohol, a nylon or a metal foil preferably aluminum. Heat shrinkable meat bags, for example, have generally used vinylidene chloride copolymers. The copolymer of the vinylidene chloride may, for example, be a copolymer with vinyl chloride or methyl acrylate. Collapsible dispensing tubes have generally used one or more foil layers. The foil layers in addition to supplying an oxygen barrier also provide the dispensing tube with "deadfold", i.e., the property of a collapsible dispensing tube when squeezed to remain in the squeezed position without bouncing back.

Outer layers of films used in packaging food products can be any suitable polymeric material such as linear low density polyethylene, low density polyethylene, ionomers including sodium and zinc ionomers such ionomers include Surlyn, ethylene vinyl acetate etc. In conventional shrink bags, the outer layers are generally linear low density polyethylene or blends thereof. Suitable outer layers for meat bags are taught by U.S. Pat. No. 4,457,960 to Newsome, the disclosures of which are incorporated herein by reference.

While conventional films have been suitable for many applications, it has been found that there is a need for films that are stronger and more easily processed than conventional films. In meat bags, there is a need for films and bags that have superior toughness and sealability and the ability to undergo cross-linking without undue deterioration. Thus, it is an object of the present invention to provide improved structures, including single and multi-layer films, sheets, lidstock pouches, tubes and bags. In particular, structures for use in shrink bags wherein the shrink bags are capable of withstanding production stresses and the shrink process.

SUMMARY OF THE INVENTION

The structures of the present invention may be single or multilayer films, sheets, lidstock, pouches, containers, tubes and bags where at least one layer contains a polymer usually a copolymer formed by a polymerization reaction in the presence of a single site catalyst such as a metallocene. Examples of such a polymer are ethylene and propylene polymers and copolymers thereof. One preferred copolymer is a copolymer of ethylene and an alpha olefin where such alpha olefin has a carbon chain length of from $C_3$–$C_{20}$. The structures of he present invention may also include blends of polymers and copolymers formed by a polymerization reaction with a single site catalyst or blends of a polymer and copolymer formed by a polymerization reaction with a single site catalyst and another polymeric material. Examples of suitable polymers for blending include: high and medium density polyethylene (HDPE, MDPE), linear low density polyethylene (LLDPE), low density polyethylene (LDPE), ethylene vinyl acetate (EVA), ultra low density polyethylene (ULDPE or VLDPE), and ionomers such as Surlyn.

The present invention may also be a multilayer structure of at least three layers wherein the core layer is a barrier layer. In one embodiment of the present invention, there may be a first outer layer of an ethylene or propylene polymer or copolymer formed by a polymerization reaction in the presence of a single cell catalyst, a barrier layer and a second outer layer of a polymeric material. The second outer layer may be an ethylene or propylene polymer or copolymer formed by a polymerization reaction in the presence of a single site catalyst or a layer of another polymeric material such as high density polyethylene, medium density polyethylene, linear low density polyethylene, ultra low density polyethylene, low density polyethylene, ethylene vinyl acetate, an ionomer or blends thereof. The first outer layer Jay also be a blend of the ethylene copolymer with another suitable polymeric material such as described above. A preferred polymer formed by a single site catalyst is a copolymer of ethylene and an alpha olefin such as octene-1. Additional layers such as adhesive layers or other polymeric layers may be interposed in the structure between one or both of the outer layers or on top of one or both of the outer layers. The structure of the present invention may be rendered oriented either uniaxially or biaxially and cross-linked by any suitable means, such as for example irradiation or chemical cross-linking.

BRIEF DESCRIPTION OF THE DRAWINGS

FIG. 1 is a side view of a three layer structure of the present invention.

FIG. 2 is a side view of a five layer film of the present invention.

FIGS. 3–6 are examples of the structure of metallocene catalysts used in the polymerization of the polymer used in the structures of the present invention.

DETAILED DESCRIPTION OF THE INVENTION

The structures of the present invention include films, sheets, lidstock, pouches, containers, tubes and bags. These structures may be a single layer or multi-layer structure. The structures are comprised of polymers that have been polymerized in the presence of a single site catalyst, such as a metallocene. A metallocene is a complex organometallic molecule typically containing zirconium or titanium, with a pair of cyclic alkyl molecules. More specifically, metallocene catalysts are usually compounds with two cyclopentadiene rings fixed to the metal. These catalysts are frequently used with aluminoxanes as a co-catalyst or an activator, one suitable aluminozane is a methaliumoxane (MAO). Besides, titanium and zirconium, hafnium may also be used as the metal to which the cyclopentadiene is bonded. Alternative metallocenes may include Group IVA, VA and VIA transition metals with two cyclopentadiene rings. Also mono-cyclopentadiene rings or sibyl amides may alternatively be in the metallocene instead of two cyclopentadienes. Other metals to which the cyclopentadine may be attached may include the metals in the lanthanide series. FIGS. 3, 4, 5 and 6 show representative metallocenes that are suitable single site catalysts.

While the reaction mechanism is not completely understood, it is believed that the metallocene, single site catalyst confines the copolymerization reaction to a single site over the polymer thus controlling comonomer placement and side chain length and branching. The copolymers formed from metallocene single site catalysts are highly stereo regular products with narrow molecular weight distribution. The metallocenes can be used to polymerize ethylene, propylene, ethylenic and acetylenic monomers, dienes and carbon monoxide. Comonomers with ethylene and propylene include styrene, substituted styrene, vinyl, acrylonitrile, methyl acrylate, ethyl methacrylate and 1.4-hexadiene. The metallocene single site catalysts are capable of producing isotactic polymers and syndiotactic polymers, i.e., polymers in which the crystalline branches alternate regularly on both sides of the back bone of the polymer. There are two general types of single site catalyst reactions. The first are nonstereoselective catalysts reactions which have been developed by Exxon and Dow and which are used to make Exxon's Exact resins and Dow's CGCT resins. See FIGS. 3 and 4. The second type of reactions are stereoselective catalysts developed by Hoechst and Fina for stereo specific polymerization particularly of polypropylene and other olefins such as butene-1, and 4 methylpentene-1. See, e.g., FIGS. 5 and 6.

The ethylene alpha olefins polymerized by a single site catalyst have low crystallinity and a density that ranges from 0.854 to 0.97 gm/cc. Although this density range is similar to conventional ethylene polymers, i.e., LDPE, LLDPE and ULDPE, the polymers in the structures of the present invention have a narrow molecular weight distribution and homogeneous branching. The molecular weight distribution of the preferred polymers may be represented by the formula $MWD = M_w/M_n = <2.5$ In addition, the melt processability of these polymers $(I_{10}/I_2)$ has a range of about 5.5 to about 12 while conventional homogenous polymers are generally less than 6.5 at an MWD of 2. The melt tension of these polymers is in the range of about 1.5 to 3.5 grams.

The MWD of these polymers may be determined using a Water's 150 GPC at 140° C. with linear columns ($103_6$ A-$10^6$ A°) from Polymer Labs and a differential refractometer detector. Comparison of the MWD of a 1 MI, 0.920 density CGCT polymer with that of 1 MI, 0.920 density conventional LLDPE illustrates the very narrow MWD of the CGCT polymers which usually have a $M_W/M_N$ of approximately 2 compared to 3 or greater for LLDPE.

A preferred ethylene copolymer is a copolymer of ethylene and a $C_3$ to $C_{20}$ alpha olefin. A preferred copolymer is a low modulus ethylene octene copolymer sold by Dow. This copolymer is formed by Dow's constrained-geometry catalyst Technology which uses a single site catalyst such as cyclo-pentadienyl titanium complexes. As best understood, Dow's constrained geometry catalysts are based on group IV transition metals that are covalently bonded to a monocyclopentadienyl group bridged with a heteroatom. The bond angle between the monocyclopentadienyl group, the titanium center and the heteroatom is less than 115°. When the alpha olefin is present in the copolymer in the range of about 10 to 20% by weight these copolymers are referred to as plastomers. When the percent alpha olefin is greater than 20% these copolymers are called elastomers. The preferred ethylene octene copolymer has the octene comonomer present in an amount less than 25%. Examples of the Dow ethylene octene copolymer have the following physical properties.

| DENSITY g/cc | MOLECULAR WEIGHT DISTRIBUTION | MELT INDEX | MELT FLOW RATIO | MELT STRENGTH |
|---|---|---|---|---|
| Polymer 1. | | | | |
| 0.920 | 1.97 | 1.0 | 9.5 | 1.89 |
| 0.910 | 1.90 | 1.0 | 7.9 | 1.69 |
| 0.902 | 2.10 | 1.0 | 7.6 | 1.68 |

Molecular weight distribution is defined as the ratio of weight average molecular weight to number average molecular weight. The lower the figure, the narrower the molecular weight distribution. Melt flow ratio is defined as the ratio of melt index, as tested with a 10-kg load to the melt index with a 2-kg load. The higher the ratio, the more processable the material. Melt flow ratio is defined as melt tension measured in grams. The higher the number the greater the melt strength. Other suitable resins are the Exact resins sold by Exxon, these resins have the following characteristics:

Typical properties of Exact medical grade polyethylenes

| Property | Value by grade | | | | | |
|---|---|---|---|---|---|---|
| | 4028 | 4022 | 4021 | 4023 | 4024 | 4027 |
| Melt index (D1238)[a] | 10 | 6 | 22 | 35 | 3.8 | 4 |
| Density, g./cc. (D-1505) | 0.880 | 0.890 | 0.885 | 0.882 | 0.885 | 0.895 |
| Hardness (D-2240) | | | | | | |
| Shore A | 78 | 84 | 84 | 80 | 83 | 89 |
| Shore D | 29 | 35 | 36 | 27 | 35 | 39 |
| Tensile strength at break, p.s.i. (D-638) | 2220 | 1700 | 3260 | 620 | 2840 | 2200 |
| Tensile elongation at break, % (D-638) | >800 | >800 | >800 | >800 | >800 | >800 |
| Tensile impact, ft.-lb./sq. in. (D-1822) | 145 | 130 | 350 | 280 | 300 | 340 |
| Flexural modulus, p.s.i. (D-790) | 5040 | 4930 | 3980 | 3100 | 4180 | 7230 |
| Vicat softening point ° F. (D-1525) | 138 | 168 | 158 | 138 | 158 | 181 |

[a]: ASTM test method

The structure of the present invention is comprised of an ethylene, propylene, or styrene polymer or copolymer formed by a polymerization reaction in the presence of a single site catalyst preferably a metallocene. Ethylene may be copolymerized with any suitable monomer such as $C_3$–$C_{20}$ alpha olefin including propylene butene-1, 4-methyl pentene-1, haxene-1 and octene-1. A preferred coinonomer is octene-1. The preferred ethylene alpha olefin copolymer of the present invention has a density in the range of 0.380 gm/cc to about 0.920 gm/cc, a more preferred range of 0.390 gm/cc to about 0.915 gm/cc and a most preferred range of about 0.900 gm/cc to about 0.912 gm/cc.

FIG. 1 shows a cross section of a three layer coextruded structure. Layer 14 is the core layer which may be a barrier layer that minimizes the transmission of oxygen through the structure. Preferred barrier materials are polyvinylidene chloride copolymers such as copolymers of vinylidene chloride and vinyl chloride or an alkyl acrylate such as methyl acrylate. Other preferred barrier material includes, ethylene vinyl alcohol, nylon or a metal foil such as aluminum. Layer 14 may also be a copolymer of ethylene and styrene formed using a single site catalyst in the polymerization reaction. The copolymer of vinylidene chloride may also be polymerized by the polymerization reaction in the presence of a single site catalyst. In addition, layer 14 may also be a polystyrene formed by a polymerization reaction in the presence of a single site catalyst. One such polystyrene is the crystalline syndiotactic polystyrene sold by Idemitsu Petro-Chemical Co., Tokyo, Japan.

On opposite sides of the core layer 14 of FIG. 1 are layers 12 and 16. At least one of these layers 12 is a polymer formed by a polymerization reaction in the presence of a single site catalyst. The remaining layer 16 may be any suitable polymeric material such as a polyester, co-polyester, polyamide, polycarbonate, polypropylene, propylene-ethylene copolymer, ethylene-propyiene copolymer, combinations of polypropylene and ethylene vinyl acetate copolymer, ultra low density polyethylene, low density polyethylene, medium density polyethylene, high density polyethylene, linear low density polyethylene copolymers, linear medium density polyethylene copolymer, linear high density polyethylene copolymer, ionomer, ethylene acrylic acid copolymer, ethylene ethyl acrylate copolymer, ethylene methyl acrylate copolymer, or ethylene methacrylic acid copolymer.

In an alternate embodiment, the layer 12 may be a blend of a polymer formed by a polymerization reaction in the presence of a single site catalyst and a suitable polymeric material such as is identified in connection with the description of layer 16 above.

As seen in FIG. 2, the structure may also include embodiments which have a fourth layer 28 over the first layer 22 and a fifth polymeric layer 30 over the third layer 26. The composition of the fourth layer 28 may be selected from the same grouo of materials from which the composition of the first layer 12 or third layer 16 is selected, and the fifth layer 20 may also be the same composition as the first layer 22 or the third layer 26.

In an alternate embodiment of FIG. 2, the five layer structure may have a first layer 28 similar in composition to layer 12 of FIG. 1, i.e., the film may have a first layer of a polymer formed by the polymerization reaction with a single site catalyst or blends thereof with another suitable polymeric material one or both of the second 22 and fourth 26 layers may be an adhesive layer.

The composition of adhesive layers 22 and 26 is selected for its capability to bond the core or barrier layer 24 to the surface layers 28 and 30. A variety of the well known extrudable adhesive polymers adhere well to the core or barrier layer 24. Thus, if for example Layer 20 is a polypropylene, an adhesive polymer based on polypropylene is desirably selected for layer 26. Examples of such adhesives are the extrudable polymers available under the trade designations Admer QF-500, QF550, of (F-551 from Mitsui Petrocnemical Company, or Exxon 5610A2.

If the composition of layer 28 or 30 is an ethylene based polymer or copolymer, an adhesive polymer based on ethylene is preferably selected for layer 22, including ethylene homopolymer and copolymers. Such a preferred adhesive composition is an ethylene vinyl acetate copolymer containing 25% to 30% by weight vinyl acetate. Other ethylene based homopolymer and copolymers, modified to enhance adhesion properties are well known under the trade names of, for example, Bynel and Plexar. Typical base polymers for these extrudable adhesives are the polyethylene and the ethylene vinyl acetate copolymers. Such adhesive polymers, including the polypropylene-based polymers, are typically modified with carboxyl groups such as anhydride. Also acceptable as adhesives are ethylene methyl acrylate copolymers (EMA).

Additional layers may also be present in the structures of the present invention. For example, the present invention contemplates 4, 6, 7, 8, and higher numbers of layers in the film of the present invention and different combinations of layer structures may also be present. For example, there may be more than one barrier layer, i.e., two layers of polyvinylidene chloride copolymers, two layers of foil or two layers of EVOH or nylon. Alternatively, this may be a layer of EVOH and a layer of a polyvinylidene chloride copolymer or a polyamide or a polystyrene and other combinations of the core materials. The additional layers of the present invention also encompass ore than one Polymer formed by the polymerization reaction in the presence of a single site catalyst. The polymers may be in a layer alone or in the form of a blend. Suitable polymers for blending with an ethylene polymer formed in a polymerization reaction with a single site catalyst include other ethylene polymers formed in a polymerization reaction with a single site catalyst, LDPE, LLDPE, ULDPE, EVA, ionomers, ethylene copolymers, ethylene methyl acrylate (EMA), ethylene acrylic acid (EAA), ethyl methyl acrylic acid (EMAA), polypropylene (PP), ethylene normal butyl acrylate (ENBA), ethylene propylene copolymers (PPE). Suitable polymers for blending with a propylene polymers formed in a polymerization reaction with a single site catalyst include ethylene propylene copolymers.

Preferred blends using EVA's are those having lower VA content as they tend to yield EVA layers having better hot strength. EVA's having higher VA content tend to yield EVA layers having increased adhesion to for example, the vinylidene chloride copolymer layer. EVA's having virtually any amount of VA will have better adhesion to the vinylidene chloride copolymer layer than an ethylene homopolymer. However, good interlayer adhesion is considered desirable in the invention, and thus, steps are usually taken to enhance adhesion where no unacceptable negative effect is encountered. Thus, higher VA contents, in the range of 6% to 12% vinyl acetate are preferred, a melt index of less than 1 is also preferred. While blend amounts are shown herein in weight percent, VA contents are role percent. Especially preferred EVA's have VA content of 7% to 9% and melt index of 0.2 to 0.8. Blends of EVA's to make up the EVA component of layers 16 and 18 are acceptable.

The structure of the present invention may be formed by any conventional process. Such processes include extrusion, coextrusion, extrusion coating, extrusion lamination, adhesive lamination and the like, and combinations of processes. The specific process or processes for making a given film which is neither oriented nor cross-linked can be selected with average skill, once the desired structure and compositions have been determined.

When the structure of the present invention is a film, the film may also be oriented either uniaxially or biaxially. Orientation can also be done by any conventional process for forming multiple layer films. A preferred process includes the steps of coextrusion of the layers to be oriented, followed by orientation in one of the conventional processes such as blown tubular orientation or stretch orientation in the form of a continuous sheet; both being molecular orientation processes. The double bubble technique disclosure in Pahlke, U.S. Pat. No. 3,456,044 is suitable for use in producing the film of this invention. The films may also be formed by a tubular water quench process. In this process the film may be extruded downwardly as a tube formed by an annular die, and carried into a water quench tank, generally with a cascade of water on the outside surface providing initial cooling. The flattened tape is withdrawn from the quench bath, is reheated (normally in a second water bath) to its orientation temperature, is stretched in the machine direction between two sets of rolls that are so rotated as to establish a linear rate differential therebetween, and is simultaneously oriented in the transverse, or cross-machine, direction as an inflated bubble trapped between the nips of the rolls. In accordance with conventional practice, the film will usually be cooled by air in the orientation zone.

The film of the present invention may also be oriented and/or cross-linked. The first step is the formation of a multiple layer film. The formation of the multiple layer film, is usually most easily accomplished by coextrusion of the desired layers. Other formation processes are acceptable so long as the resulting oriented film at the conclusion of fabrication processing is a unitary structure.

The second step is orienting the multiple layer film. One method for accomplishing orientation is by heating the film to a temperature appropriate to molecular orientation and molecularly orienting it. The film may then be optionally heat set by holding it at an elevated temperature while its dimensions are maintained. The orientation step is preferentially carried out in line with the first step, which is the film formation step of the process.

The third step is subjecting the formed and oriented multiple layer film, to electron beam irradiation.

The amount of electron beam irradiation is adjusted, depending on the make-up of the specific film to be treated and the end use requirement. While virtually any amount of irradiation will induce some cross-linking, a minimum level of at least 1.0 megarads is usually preferred in order to achieve desired levels of enhancement of the hot strength of the film and to expand the range of temperature at which satisfactory heat seals may be formed. While treatment up to about 50 megarads can be tolerated, there is usually no need to use more than 10 megarads, so this s a preferred upper level of treatment the most preferred dosage being 2 to 5 megarads.

The third step of subjecting the film to electron beam irradiation is performed only after the multiple layer film has been formed, and after molecular orientation, in those embodiments where the film is molecularly oriented. It should be noted that, in the irradiation step, all of the layers in the film are exposed simultaneously to the irradiation sources, such that irradiation of all the layers of the film takes place simultaneously.

In one embodiment of the process, the second step of orientation may be omitted and the unoriented multiple layer film may be cross-linked by irradiation treatment to produce a cross-linked, unoriented, multiple layer film.

EXAMPLES

Multilayer films may be prepared according to the present invention. Biaxially stretched three layer films may be prepared by a "double bubble" process similar to that disclosed in U.S. Pat. No. 3,456,044 by coextruding the following compositions through a multilayer die, biaxially stretching the coextruded primary tube. The films may also be irradiated if desired.

Example 1

Layer 1—Copolymer of ethylene and an alpha olefin such as Hexene-1 or Octene-1 formed by the polymerization reaction in the presence of a single site catalyst or metallocene (hereinafter CEO)
Layer 2—Vinylidene chloride—methyl acrylate (VDC-MA) copolymer
Layer 3—Polyolefin. This film may be biaxally stretched and if necessary irradiated.

|  | EXAMPLE 2 | EXAMPLE 3 | EXAMPLE 4 |
|---|---|---|---|
| Layer 1 | CEO | CEO | CEO-EVA blend |
| Layer 2 | VDC-MA | VDC-MA | VDC-MA |
| Layer 3 | ULDPE-EVA blend | CEO | CEO-EVA blend |
|  | EXAMPLE 5 | EXAMPLE 6 | EXAMPLE 7 |
| LAYER 1 | CEO | CEO | CEO-EVA blend |
| LAYER 2 | Nylon | Nylon | Nylon |
| LAYER 3 | CEO | ULDPE-EVA | CEO-EVA blend |

|  | EXAMPLE 8 | EXAMPLE 9 |
|---|---|---|
| LAYER 1 | Polyolefin | Polyolefin |
| LAYER 2 | Styrene copolymer formed by the polymerization reaction with a single site catalyst | Propylene copolymer formed by the Polymerization reaction with a single site catalyst |
| LAYER 3 | Polyolefin | Polyolefin |

|  | EXAMPLE 10 | EXAMPLE 11 | EXAMPLE 12 |
|---|---|---|---|
| LAYER 1 | CEO | CEO | CEO-EVA Blend |
| LAYER 2 | CEO | EVOH | EVOH |
| LAYER 3 | CEO | ULDPE-EVA Blend | CEO-EVA Blend |
|  | EXAMPLE 13 | EXAMPLE 14 | EXAMPLE 15 |
| LAYER 1 | CEO | CEO | CEO-EVA Blend |
| LAYER 2 | Tie | Tie | Tie |
| LAYER 3 | PVDC Copolymer or EVOH | PVDC Copolymer or EVOH | PVDC Copolymer or EVOH |
| LAYER 4 | Tie | Tie | Tie |
| LAYER 5 | ULDPE-EVA Blend | CEO | CEO-EVA Blend |

|  | EXAMPLE 16 |
|---|---|
| LAYER 1 | EVA-ULDPE |
| LAYER 2 | ULDPE or CEO |
| LAYER 3 | PVDC Copolymer or EVOH |
| LAYER 4 | EVA |
| LAYER 5 | CEO or blend of CEO and EVA |

The following examples may also be prepared in accordance with the present invention:

Example 17

Meat Film—Forming Web Formed by TWQ Process (Tubular Water Quench Process)
LAYER 1 Nylon
LAYER 2 Tie
LAYER 3 EVOH
LAYER 4 Tie
LAYER 5 CEH or CEO
CEH is a copolymer of ethylene and Hexene-1 formed by the polymerization reaction in the presence of a single site catalyst or a metallocene. Other alpha olefins can be polymerized with the ethylene also.

Example 18–20

Innerliner Films—These films can be formed either on a blown film line or by using a tubular water quench.
LAYER 1 HDPE
LAYER 2 Blend of CEH or CEO and EVA and polybutylene
LAYER 1 HDPE
LAYER 2 CEH or CEO and polybutylene
LAYER 1 HDPE
LAYER 2 CEH or CEO Example 21 and 22

Meat—Non Forming Top Web Film
LAYER 1 PVDC coated PET
LAYER 2 Adhesive (lamination)
LAYER 3 CEO or CEH
This film nay be formed by adhesive laminating a film formed of a copolymer of ethylene and an alpha olefin with the PVDC coated PET film.
LAYER 1 PVDC coated PET
LAYER 2 LDPE—extrusion laminated
LAYER 3 LDPE/CEH or CEO coextrusion
This film can be formed by extrusion laminating a film of PVDC coated PET or LDPE.

Example 23

Layer 1—Blend of two or more copolymers of ethylene and an alpha olefin polymerized in the presence of a single site catalyst or metallocene such as CEO with either CEH or CEB. CEB is a copolymer of ethylene and butene-1 formed by a polymerization reaction in the presence of a single site catalyst or a metallocene.

Example 24

Layer 1—Blend of a copolymer of ethylene and an alpha olefin formed by a polymerization reaction in the presence of a single site catalyst or a metallocene with Polyethylene or other polyolefin such as EVA, EMA, EAA, EMAA, ionomers, ENBA, PP or PPE.
The films of example 23 and 24 can either be single layer films or multi layer films where additional layers are present on layer 1.

We claim:

1. A heat shrink film comprising at least two layers wherein a first layer comprises a polymer formed by the polymerization reaction with a single site catalyst.

2. The heat shrink film according to claim 1 wherein said first layer comprises an ethylene polymer formed by the polymerization reaction with a single site catalyst.

3. The heat shrink film according to claim 1 wherein said first layer comprises a propylene polymer formed by the polymerization reaction with a single site catalyst.

4. The heat shrink film according to claim 1 wherein said first layer comprises a vinylidene chloride copolymer formed by the polymerization reaction with a single site catalyst.

5. The heat shrink film according to claim 1 wherein said first layer comprises polystyrene formed by the polymerization reaction with a single site catalyst.

6. The heat shrink film of claim 2 where said polymer is a copolymer of ethylene.

7. The heat shrink film of claim 6 where said polymer is a copolymer of ethylene and a $C_3$–$C_{20}$ alpha olefin.

8. The heat shrink film according to any of claims 1 or 2–7 wherein said single site catalyst is a metallocene.

9. The heat shrink film according to claim 7 wherein said alpha olefin is butene-1.

10. The heat shrink film according to claim 7 wherein said alpha olefin is hexene-1.

11. The heat shrink film according to claim 7 wherein said alpha olefin is 4-methyl pentene-1.

12. The heat shrink film according to claim 7 wherein said alpha olefin is octene-1.

13. The heat shrink film according to any of claims 6–7 or 9–12 wherein said film is molecularly oriented.

14. The heat shrink film according to any of claims 6–7 or 9–12 wherein said film is biaxially oriented.

15. The heat shrink film according to any of claims 6–7 or 9–12 wherein said film is cross-linked.

16. The heat shrink film according to any of claims 6–7 or 9–12 wherein said film is irradiated.

17. A heat shrink film structure comprising at least two layers wherein a first layer comprises a polymer formed by the polymerization reaction with a metallocene catalyst system.

18. The heat shrink film according to claim 17 wherein said first layer comprises an ethylene polymer formed by the polymerization reaction with a metallocene catalyst system.

19. The heat shrink film according to claim 17 wherein said first layer comprises a propylene polymer formed by the polymerization reaction with a metallocene catalyst system.

20. The heat shrink film according to claim 17 wherein said first layer comprises vinylidene chloride copolymer formed by the polymerization reaction with a metallocene catalyst system.

21. The heat shrink film according to claim 17 wherein said first layer comprises a polystyrene formed by the polymerization reaction with a metallocene catalyst system.

22. The heat shrink film of claim 18 where said polymer is a copolymer of ethylene.

23. The heat shrink film of claim 22 where said polymer is a copolymer of ethylene and a $C_3$–$C_{20}$ alpha olefin.

24. The heat shrink film according to claim 23 wherein said alpha olefin is butene-1.

25. The heat shrink film according to claim 23 wherein said alpha olefin is hexene-1.

26. The heat shrink film according to claim 23 wherein said alpha olefin is 4-methyl pentene-1.

27. The heat shrink film according to claim 23 wherein said alpha olefin is octene-1.

28. The heat shrink film according to any one of claims 21–27 wherein said film is molecularly oriented.

29. The heat shrink film according to any one of claims 21–27 wherein said film is biaxially oriented.

30. The heat shrink film according to any one of claims 21–27 wherein said film is cross-linked.

31. The heat shrink film according to any one of claims 21–27 wherein said film is irradiated.

32. A heat shrink film comprising:

a first layer comprising one or more polymers formed by a polymerization reaction with a single site catalyst;

a second layer disposed adjacent to the first layer, the second layer comprising an adhesive material;

a third layer disposed adjacent to the second layer, the third layer comprising a barrier material;

a fourth layer disposed adjacent to the third layer, the fourth layer comprising a second adhesive material; and a fifth layer disposed adjacent to the fourth layer, the fifth layer comprising a polymer formed by a polymerization reaction with a single site catalyst;

wherein the first and fifth layers are outermost layers of the structure.

33. The heat shrink film of claim 33 wherein the single site catalyst is metallocene.

34. The heat shrink film of claim 32 wherein the first layer comprises a copolymer of ethylene and a $C_3$–$C_{20}$ alpha olefin formed by a polymerization reaction with a single site catalyst.

35. The heat shrink film of claim 34 wherein the alpha olefin comprises butene-1, hexene-1, 4-methyl pentene-1, or octene-1.

36. The heat shrink film of claim 32 wherein the barrier material is selected from the group consisting of ethylene vinyl alcohol, polyvinylidene chloride, and metal foil.

37. The heat shrink film of claim 32 wherein the fifth layer comprises a copolymer of ekthylene and C3–C20 alpha olefin formed by a polymerization reaction with a single site catalyst.

38. The heat shrink film of claim 32 wherein the fifth layer comprises a blend of a polymer formed by a reaction with a single site catalyst and ethylene vinyl acetate.

39. The heat shrink film of claim 32 wherein the first layer comprises a blend of a polymer formed by a reaction with a single site catalyst and low density polyethylene.

* * * * *

Adverse Decision In Interference

Patent No. 6,437,064, John P. Eckstein, Johnny Q. Zheng, Mark E. Nordness, Keith D. Lind, George H. Walburn, Mary E. Shepard, Gregory K. Jones, Gregory J. Seeke, STRUCTURES OF POLYMERS MADE FROM SINGLE SITE CATALYSTS, Interference No. 105,092, final judgment adverse to the patentees rendered, September 16, 2005 as to claims 1-3, 6-19, 22-39.

*(Official Gazette, March 7, 2006)*